United States Patent
Peng et al.

(10) Patent No.: US 6,618,445 B1
(45) Date of Patent: Sep. 9, 2003

(54) SCALABLE MPEG-2 VIDEO DECODER

(75) Inventors: Shaomin Peng, Yorktown, NY (US);
Zhun Zhong, Stamford, CT (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/709,260

(22) Filed: Nov. 9, 2000

(51) Int. Cl.[7] .......................... H04N 7/12; H04N 11/02; H04N 11/04
(52) U.S. Cl. ............................. 375/240.25
(58) Field of Search ............ 375/240.25, 240.27, 375/240.02, 240.03, 240.13, 240.16, 240.22, 240.23; 348/419.1, 425.1, 439.1; H04N 7/12, 11/02, 11/04

(56) References Cited

U.S. PATENT DOCUMENTS

| | | | |
|---|---|---|---|
| 4,999,704 A | * 3/1991 | Ando | 375/240.12 |
| 5,469,273 A | 11/1995 | Demura | |
| 5,623,423 A | 4/1997 | Lipovski | |
| 5,668,601 A | * 9/1997 | Okada et al. | 375/240.25 |
| 5,767,907 A | 6/1998 | Pearlstein | |
| 5,818,967 A | * 10/1998 | Bhattacharjee et al. | 382/233 |
| 5,903,311 A | 5/1999 | Ozcelik et al. | |
| 6,282,245 B1 | * 8/2001 | Oishi et al. | 375/240.28 |
| 6,295,321 B1 | * 9/2001 | Lyu | 375/240.25 |
| 6,414,991 B1 | * 7/2002 | Yagasaki et al. | 375/240.12 |

FOREIGN PATENT DOCUMENTS

| | | | | |
|---|---|---|---|---|
| EP | 0 889 963 | * | 3/1999 | H04N/7/50 |
| WO | WO9535628 | | 12/1995 | H04N/7/26 |

OTHER PUBLICATIONS

Mattavelli M et al, "Computational Graceful Degradation For Video Sequence Decoding", Oct., 1997, pp. 330–333.*
Mattavelli M et al., "Implementing Real–Time Video Decoding On Multimedia Processors By Complexity Prediction Techniques", 1998 International Conference On Consumer Electronics, Jun. 2–4, 1998, whole document.*

* cited by examiner

Primary Examiner—Nhon Diep
(74) Attorney, Agent, or Firm—Russell Gross

(57) ABSTRACT

A system and method for scaling an MPEG-2 video decoder subject to a resource constraint. A decoder system is provided for decoding compressed video data arranged in a group of pictures, wherein the group of pictures include I pictures, P pictures and B pictures. The system comprises a processing path for decoding an error residual associated with the group of pictures, and a filtering system for preventing the error residual associated with B pictures from being decoded by the processing path. The decoder system may further comprise a system for selectively enabling the filtering system for B pictures having a DC coefficient that is below a predetermined threshold.

18 Claims, 3 Drawing Sheets

SCALABLE MPEG-2 VIDEO DECODER

BACKGROUND OF THE INVENTION

1. Technical Field

The present invention relates to decoding compressed video signals, and more particularly relates to a system and method for scaling an MPEG-2 video decoder.

2. Related Art

The MPEG standards are an evolving set of standards for video and audio compression developed by the Moving Picture Experts Group (MPEG). MPEG-1 was designed for coding progressive video at a transmission rate of about 1.5 million bits per second. It was designed specifically for Video-CD and CD-i media. MPEG-2 was designed for coding interlaced images at transmission rates above 4 million bits per second. The MPEG-2 standard is used for various applications, such as digital television (DTV) broadcasts, digital versatile disk (DVD) technology, and video storage systems.

According to the MPEG-2 standard, an MPEG-2 sequence is divided into a series of GOPs (Group Of Pictures). There are three different types of pictures, with each being essentially a frame of pixels. Each GOP begins with an Intra-coded picture (I picture) followed by an arrangement of forward Predictive-coded pictures (P pictures) and Bi-directionally predictive-coded pictures (B pictures). I pictures are fields or frames coded as a stand-alone still image. P pictures are fields or frames coded relative to the nearest I or P picture, resulting in forward prediction processing. P pictures allow more compression than I pictures through the use of motion compensation, and also serve as a reference for B pictures and future P pictures. B pictures are fields or frames that use the most proximate past and future I and P pictures as a reference, resulting in bi-directional prediction.

As the digital TV market gradually begins to dominate the TV market and other video applications become more desirable, the demand for systems having advanced capabilities for processing MPEG-2 pictures becomes stronger and stronger. The current emerging architecture for processing MPEG-2 data, such as that found in DTV set-top boxes and high end digital TV's, typically utilize a combination of a digital signal processing central processing units (DSPCPU), control processors, coprocessors, and software applications. Unfortunately, even with all these resources, advanced audio/visual processing functions tend to consume more computational power than is often available.

One of the key elements in MPEG-2 processing is the MPEG-2 decoder, which converts a bitstream of compressed MPEG-2 data into pixel images. The main components of a generic MPEG-2 decoder 10 are shown in FIG. 1. There are four functional blocks: a variable length decoder (VLD) 12, an inverse quantization (IQ) system 14, an inverse discrete cosine transform system (IDCT) 16, and a motion compensation (MC) system 18. Memory 20 is used to store the reference frames. The adder combines the error residuals output from IDCT 16 (path 1) with motion compensation results (path 2) to form the final video output 24. Unfortunately, each of these functional components consume a significant amount of computational power, which drives up the cost, and limits the flexibility of digital video systems using MPEG-2 technology. Accordingly, making a highly efficient, cost effective decoder remains one of the main goals of all electronics manufacturers.

One solution for addressing the processing requirements of MPEG-2 decoders is to provide specialized hardware systems that increase computational power. For example, U.S. Pat. No. 5,903,311, issued to Ozcelik et al. on May 11, 1999, which is hereby incorporated by reference, describes a chip that includes specialized circuits for an MPEG-2 decoder. Unfortunately, while overall hardware costs continue to decrease, the costs involved in designing and building specialized hardware such as this increase the expense of the decoder.

A preferred solution therefore is to implement as much functionality as possible in software, which provides significant cost and flexibility advantages over hardware solutions. In particular, software solutions reduce the need for expensive hardware, such as coprocessors, and will allow multiple video functions to run concurrently on a DSPCPU core. However, software applications tend to run too slow to handle occasions when computationally intensive decoding operations are required. Accordingly, a need exists to provide enhanced systems that will provide inexpensive MPEG-2 decoder solutions while maintaining an acceptable level of video quality.

SUMMARY OF THE INVENTION

This invention overcomes the above-mentioned problems, as well as others, by providing a scalable decoder system. In a first aspect, the invention includes a decoder system for decoding a compressed video signal having B pictures, comprising: a first processing path that decodes an error residual of the compressed video signal; a second processing path that decodes motion compensation of the compressed video signal; and a filtering system for preventing the error residual associated with B pictures from being decoded by the first processing path. The decoder system may further comprise a system for selectively enabling the filtering system.

In a second aspect, the invention provides a method for decoding compressed video data having different types of coded pictures and outputting displayable pixel data, comprising the steps of: receiving the compressed video data; providing a first and second processing path for processing the compressed video data; identifying pictures of a predetermined type from the compressed video data; and preventing a block associated with at least one of the identified pictures from being processed by the first processing path. The method may be further refined by preventing the processing of only those identified pictures that have a picture characteristic value that is below a predetermined threshold.

In a third aspect, the invention provides a decoder system for decoding compressed video data arranged in a group of pictures, wherein the group of pictures includes at least one B picture, comprising: a processing system for decoding an error residual associated with the group of pictures; and a filtering system for preventing the error residual associated with the B picture from being decoded by the processing system. The decoder system may further include a system for selectively enabling the filtering system.

Accordingly, it is an advantage of the present invention to provide a video processing solution that results in an acceptable level of output degradation in a real-time system that is subject to resource constraints.

It is a further advantage to provide a system and method for efficiently scaling a decoder while maintaining an acceptable level of output quality.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE DRAWINGS

Overview

Figure 2:
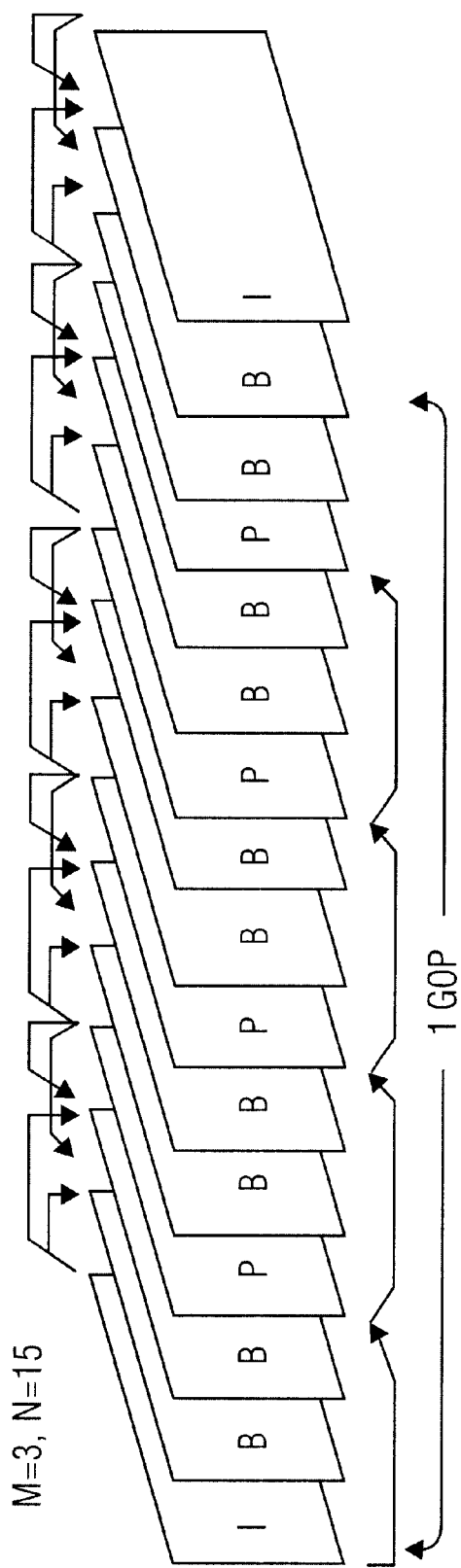
FIG. 2 depicts a graphical representation of a group of pictures (GOP)

As noted above, in the MPEG-2 standard, there are three types of pictures: I, P and B, and the pictures are coded within a unit referred to as a group of pictures (GOP). Referring to FIG. 2, a GOP is depicted containing a series of pictures beginning with I pictures. As can be seen by the arrows above the GOP, the decoding of I pictures do not need any previous decoded picture. Therefore, there is no prediction drift. In contrast, the decoding of a P picture depends on the previously decoded I or P picture. If the prediction is not accurate, the prediction drift accumulates. B pictures are predicted from previous and future I or P pictures. Both P and B pictures carry prediction errors, but B pictures do not contribute to the error accumulation and propagation.

The quality of I and P pictures (i.e., reference pictures) is critical because any error made in these two types of pictures will propagate to the following pictures. However, a B picture does not contribute to any error propagation and therefore has no impact on the quality of the following pictures. Furthermore, the computation of B pictures is the most expensive one of all three types of pictures due to the bi-directional prediction. Accordingly, the potential savings of scaling back the computation of B pictures is not only greater than the other picture types, but will also result in less overall quality degradation.

Figure 1:
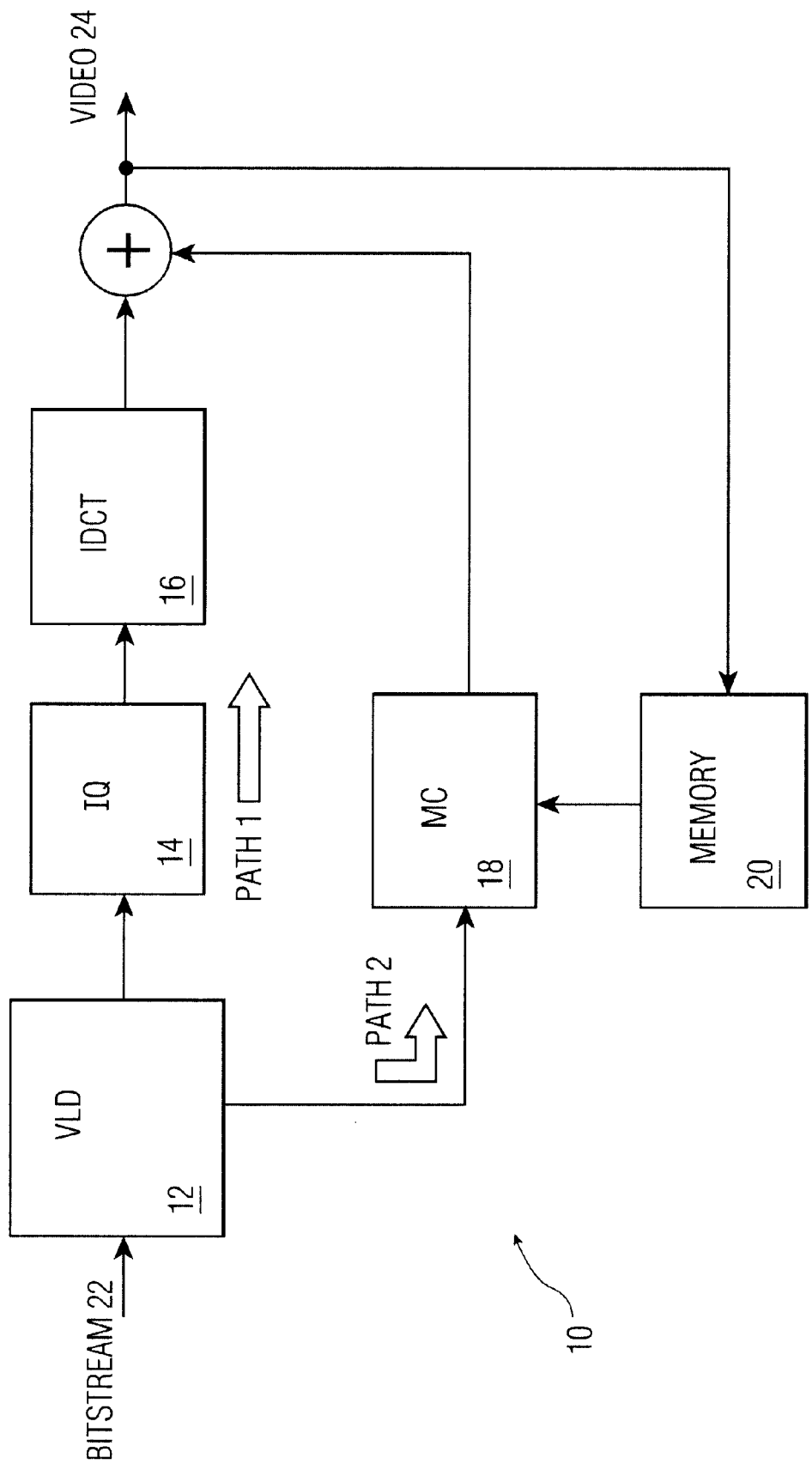
FIG. 1 depicts a functional diagram of a video decoder.

Referring back to FIG. 1, from the MPEG-2 decoding system point of view, I pictures require decoding only along the first processing path, (PATH 1) which decodes coded pixel data. For decoding P and B pictures, two processing paths exist. In particular, the first processing path (PATH 1) decodes the coded prediction error residual and a second processing path (PATH 2) decodes the motion compensation results. The combination of these two paths gives the final decoded pixel output. Of all the functional blocks, the IDCT block 16 is one of the most computationally intensive units. Accordingly, scaling back processing performed along the first processing path will generally result in the greatest computational savings.

Exemplary Embodiments

Figure 3:
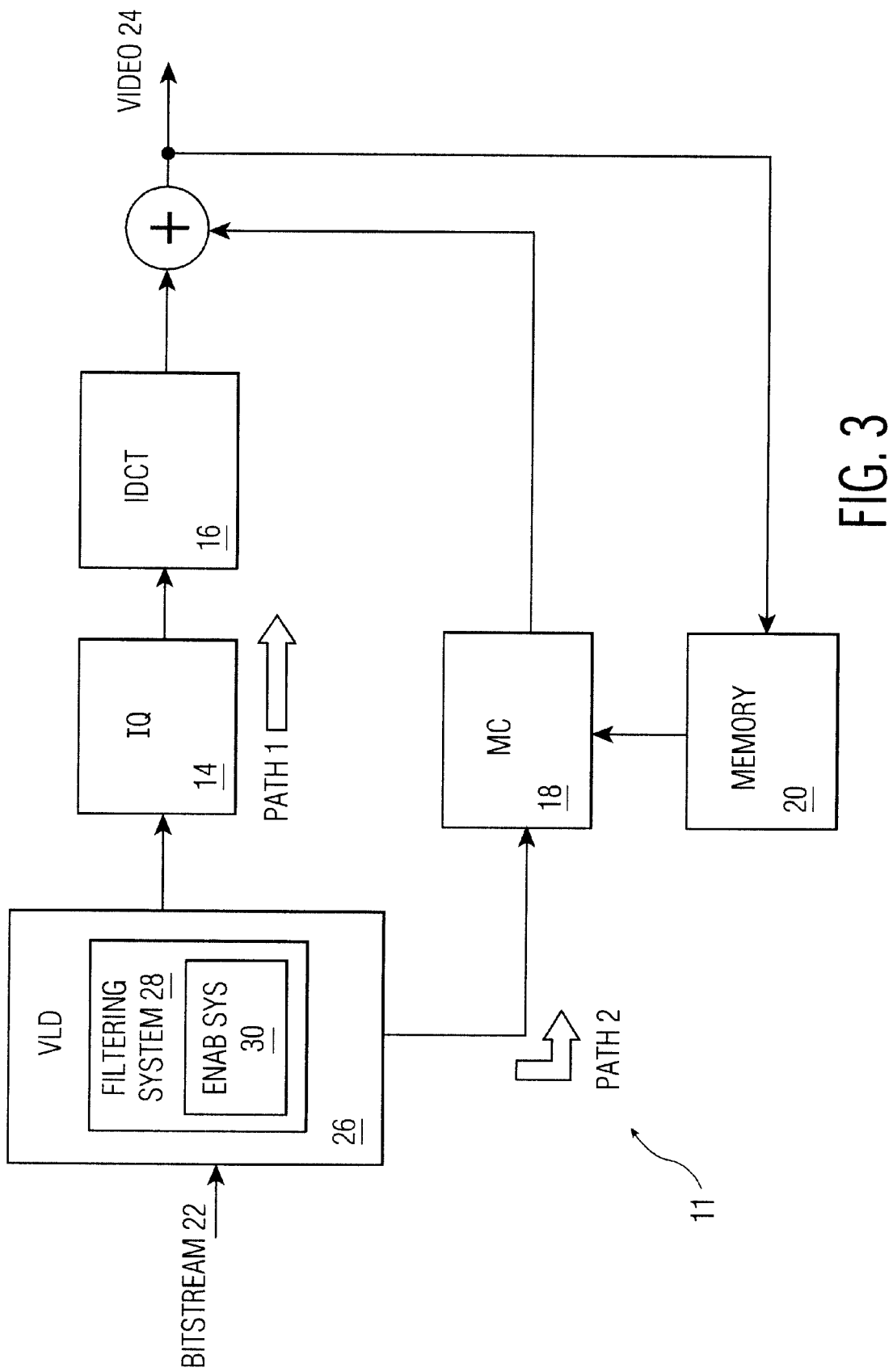
FIG. 3 depicts a functional diagram of a video decoder having a filtering system in accordance with a preferred embodiment of the present invention.

The present invention seeks to capitalize on the potential computational savings identified above by scaling back: (1) B picture decoding, and (2) processing performed by the first processing path in an MPEG-2 decoder. A first scheme proposes to skip or prevent the decoding of error residual associated with B pictures. This process is referred to herein as filtering. A second scheme proposes to selectively skip or prevent (i.e., filter) the decoding of error residual associated with B pictures. Referring to FIG. 3, a modified MPEG-2 decoder 11 is shown. Decoder 11 includes the same functionality as decoder 10 shown in FIG. 1, except that decoder 11 includes a filtering system 28, and may further comprise an enabling system 30 for selectively enabling filtering system 28.

As noted above, the decoding of error residual occurs along the first processing path (PATH 1). Filtering system 28 provides a mechanism that inhibits B picture data from being processed by the first processing path. Although shown as residing as part of VLD 26, it is understood that filtering system 28 can be implemented anywhere within the first processing path. Moreover, it is understood that decoder 11 and filtering system 28 can be implemented in hardware, software, or a combination of hardware and software. The decoder 11 and filtering system 28 may be implemented by any type of computer system—or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

1. Total Filtering of the Residual Computation Of B Pictures

Pictures are comprised of blocks of data relating to the picture. One type of block is an error residual block that includes DCT (discrete cosine transform) coefficients. Experimentation has shown that for slow motion pictures, the error residual blocks have very small values. Completely skipping the decoding of such error residual blocks will therefore not degrade the output quality severely. Nonetheless, the computational resources that are saved by skipping this step are considerable. Accordingly, for certain types of video data, implementing a scheme in which the error residual associated with B pictures is skipped will yield an acceptable output and provide significant computational savings. Experimental results show that this method works particularly well for slow to moderate motion sequence.

As noted, filtering system 28 shown in FIG. 3 provides the mechanism for implementing such a scheme. At VLD 26, a determination is made by filtering system 28 to determine if the current picture is a B picture. A preferred method for determining this is to examine the picture header, which will indicate the type of picture (i.e., I, P or B). If the current picture is a B picture, then the error residual information will not be sent to IQ 14 and IDCT 16, thereby causing the first processing path to be skipped. The decoding process will only proceed along the second processing path.

The computational savings for skipping the processing of B picture residual error can be quite significant. One way to estimate the savings is to analyze the complexity level required to process a GOP for a decoder with and without filtering system 28. The complexity level for processing a GOP can be estimated as follows, where N is the size of the GOP and M is the spacing between reference frames. Assume that $C_{VLD}$, $C_{IQ+IDCT}$, $C_{MC}$ and $C_+$ represent the needed average compute power (complexity level) for each functional block VLD, IQ+IDCT, MC and the adder "+," respectively, for each picture or frame. Then the average compute power for a generic MPEG-2 decoder (FIG. 1) in one GOP, denoted as $C_g$, is estimated as $$C_g = \frac{C_{VLD} \cdot N_{I+P+B} + C_{IQ+IDCT} \cdot N_{I+P+B} + C_{MC} \cdot N_{P+B} + C_{adder} \cdot N_{P+B}}{N_{I+P+B}}.$$

Note that $N_I$, $N_P$, and $N_B$ denotes the total number of each type of frame within the GOP, $N_{P+B}$ denotes the total number of P and B frames within one GOP, and $N_{I+P+B}=N$.

By further assuming that CS is the average compute power of the MPEG-2 decoder (FIG. 3) in one GOP that skips the residual calculation for B frames. Then $$C_s = \frac{C_{VLD} \cdot N_{I+P+B} + C_{IQ+IDCT} \cdot N_{I+P} + C_{MC} \cdot N_{P+B} + C_{adder} \cdot N_P}{N_{I+P+B}},$$

where $N_{I+P}$ denotes the total number of I and P pictures within one GOP. Then, $$C_s/C_g = \frac{C_{VLD} \cdot N_{I+P+B} + C_{IQ+IDCT} \cdot N_{I+P} + C_{MC} \cdot N_{P+B} + C_{adder} \cdot N_P}{C_{VLD} \cdot N_{I+P+B} + C_{IQ+IDCT} \cdot N_{I+P+B} + C_{MC} \cdot N_{P+B} + C_{adder} \cdot N_{P+B}}$$

Assume $C_g=1$, then $$C_s = 1 - \frac{N_B}{N_{I+P+B}}(C_{IQ+IDCT} + C_{adder}).$$

Then, for example, if a GOP was defined as having size N=15 and M=3, then $N_B$=10, and $$C_s = 1 - \tfrac{2}{3}(C_{IQ+IDCT} + C_{adder}).$$

Assume that $C_{IQ+IDCT}+C_{adder}$ represents 30% of the complexity of the decoder (which is a reasonable assumption), then $C_s$=80%. This indicates that if all the residual computations for B pictures in the MPEG-2 decoder 11 are skipped for the defined GOP, then the total compute complexity per frame is 80% of the original generic decoding complexity.

2. Selective Filtering of the Residual Computation Of B Pictures

As mentioned earlier, the first scheme works well for moderate to slow or no motion sequence. For fast motion sequences, such as sports scenes, the decoding quality of the above scheme results in a potentially unsatisfactory output. The following scheme, which selectively blocks the residual computation of B pictures, is proposed to adapt to all kinds of sequences, regardless of the motion. In the embodiment depicted in FIG. 3, VLD 26 is shown with filtering system 28, which includes enable system 30. Enable system 30 selectively enables filtering mechanism 28, i.e., it dynamically decides whether to allow or skip the residual computation of B pictures along the first processing path.

One implementation for this operation is as follows. If the picture header indicates that the current picture is a B picture, a decision is made to either skip the processing along the first processing path, or proceed with the normal decoding steps (first path+second path). The decision may be based on any relevant criteria. A preferred method is to compare the DC coefficient of each block with a preset threshold. The DC coefficient is the coefficient generally located at the top left corner of the DCT block and is a good indicator of the energy in the error residual block.

The procedure is described as follows:

If the DC coefficient of current block is greater than or equal to the preset threshold, indicating the current block is a high-energy block, then the error residual block is processed as if it were a generic decoder 10 (PATH 1 and PATH 2 are implemented).

If the DC coefficient is smaller than the preset threshold, the residual computation for this block is skipped (only the second processing path is used for decoding), and the video output is equal to the MC result.

If it is assumed that some ratio "$\gamma$" of blocks in B pictures are kept in the decoding process (where $0 \leq \gamma \leq 1$), then the complexity of this scheme can be estimated as follows:

$$C_s = 1 - \frac{N_B}{N_{I+P+B}}(1-\gamma)(C_{IQ+IDCT} + C_{adder}).$$

This equation indicates that when the number of B pictures ($N_B$) increases, particularly the low energy blocks in B pictures ($\gamma$ small), the average complexity level of the decoder decreases. Experimental results show that in a typical fast motion scene, 80%–90% of the B blocks are considered to be low energy blocks, and are therefore skipped as in the first scheme.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims. For instance, although the description provided herein generally relates to MPEG-2 decoders, it is understood that the invention can be applied to any system where different types of pictures are processed by multiple processing paths.

We claim:

1. A decoder system for decoding a compressed video signal having B pictures, comprising:
   a first processing path that decodes an error residual of the compressed video signal;
   a second processing path that decodes motion compensation of the compressed video signal; and
   a filtering system for preventing the error residual associated with B pictures from being decoded by the first processing path.

2. The decoder system of claim 1, wherein the first processing path includes a variable length decoder, an inverse quantization system, and an inverse discrete cosine transform system.

3. The decoder system of claim 2, wherein the filtering system resides within the variable length decoder.

4. The decoder system of claim 3, wherein the filtering system prevents residual discrete cosine transform coefficients from being passed to the inverse quantization system and the inverse discrete cosine transform system.

5. The decoder system of claim 1, wherein the filtering system identifies B pictures by examining header details of each frame of the compressed video signal.

6. The decoder system of claim 1, further comprising a system for selectively enabling the filtering system.

7. The decoder system of claim 6, wherein the system for selectively enabling the filtering system compares a DC coefficient of each B picture with a preset threshold.

8. The decoder system of claim 7, wherein the filtering system is enabled when the DC coefficient is smaller than the preset threshold.

9. The decoder system of claim 7, wherein the filtering system is disabled when the DC coefficient is larger than the preset threshold.

10. A method for decoding compressed video data having different types of coded pictures and outputting displayable pixel data, comprising the steps of:

receiving the compressed video data;

providing a first and second processing path for processing the compressed video data:

identifying pictures of a predetermined type from the compressed video data; and preventing a block associated with at least one of the identified pictures having a DC coefficient that is below a predetermined threshold from being processed by the first processing path.

11. The method of claim 10, comprising the further step of preventing blocks associated with each of the identified pictures from being processed by the first processing path.

12. A method for decoding compressed video data having different types of coded pictures and outputting displayable pixel data, comprising the steps of:

receiving the compressed video data;

providing a first and second processing path for processing the compressed video data:

identifying pictures of a predetermined type from the compressed video data; and preventing a block associated with at least one of the identified pictures from being processed by the first processing path;

wherein the compressed video data is in an MPEG-2 format, the different types of coded pictures include I pictures, P pictures and B pictures, and the at least one identified picture is a B picture.

13. A method for decoding compressed video data having different types of coded pictures and outputting displayable pixel data, comprising the steps of:

receiving the compressed video data;

providing a first and second processing path for processing the compressed video data:

identifying pictures of a predetermined type from the compressed video data; and preventing a block associated with at least one of the identified pictures from being processed by the first processing path;

wherein the first processing path includes an inverse quantization system and an inverse discrete cosine transform system, and the second processing path includes a motion compensation system.

14. A decoder system for decoding compressed video data arranged in a group of pictures, wherein the group of pictures include at least one B picture, comprising:

a processing system for decoding an error residual block associated with the group of pictures; and a filtering system for preventing the error residual block associated with the B picture from being decoded by the processing system.

15. The decoder system of claim 14, wherein the processing system includes an inverse quantization system and an inverse discrete cosine transform system.

16. The decoder system of claim 14, further comprising a system for selectively enabling the filtering system.

17. The decoder system of claim 16, wherein the system for selectively enabling the filtering system enables the filtering system based on information extracted from the B picture.

18. The decoder system of claim 16, wherein the system for selectively enabling the filtering system enables the filtering system when a DC coefficient of the B picture is below a predetermined threshold.

* * * * *